(12) United States Patent
Näslund et al.

(10) Patent No.: US 8,861,427 B2
(45) Date of Patent: Oct. 14, 2014

(54) REDUCTION OF INTERFERENCE IN RELAY SYSTEMS

(75) Inventors: Lars Näslund, Solna (SE); Peter Moberg, Stockholm (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 119 days.

(21) Appl. No.: 13/805,918

(22) PCT Filed: Jun. 30, 2010

(86) PCT No.: PCT/SE2010/050750
§ 371 (c)(1),
(2), (4) Date: Dec. 20, 2012

(87) PCT Pub. No.: WO2012/002854
PCT Pub. Date: Jan. 5, 2012

(65) Prior Publication Data
US 2013/0100877 A1    Apr. 25, 2013

(51) Int. Cl.
| H04B 7/14 | (2006.01) |
| H04J 1/10 | (2006.01) |
| H04J 3/08 | (2006.01) |
| H04W 4/00 | (2009.01) |
| H04W 72/12 | (2009.01) |
| H04B 7/26 | (2006.01) |
| H04W 24/02 | (2009.01) |
| H04B 7/155 | (2006.01) |
| H04W 84/04 | (2009.01) |

(52) U.S. Cl.
CPC .......... *H04W 24/02* (2013.01); *H04W 72/1247* (2013.01); *H04B 7/2606* (2013.01); *H04W 84/047* (2013.01); *H04B 7/155* (2013.01)

USPC .......................................... 370/315; 370/332

(58) Field of Classification Search
CPC ... H04W 84/047; H04W 16/26; H04W 88/04; H04B 7/2606; H04B 7/15542
USPC ........................................................ 370/315
See application file for complete search history.

(56) References Cited

U.S. PATENT DOCUMENTS

| 2008/0070510 A1 | 3/2008 | Doppler et al. |
| 2009/0233544 A1* | 9/2009 | Oyman et al. .................... 455/7 |

(Continued)

FOREIGN PATENT DOCUMENTS

| WO | WO 2009/055619 A1 | 4/2009 |
| WO | WO 2010/033065 A1 | 3/2010 |

*Primary Examiner* — Andrew Chriss
*Assistant Examiner* — Atique Ahmed

(57) ABSTRACT

The present disclosure relates to a method and an access node 112 for reducing interference The access node 112 communicates with a user equipment 111 over a wireless access interface a i in a wireless communication network 100 The method comprises the actions of obtaining (S2) timing information indicative of one or more periods when a relay node 116 communicates with a donor node 112 over a wireless backhaul interface b h i, and identifying (S1) that the user equipment 111 is receiving a signal from the relay node 116 communicating with the donor node 112 over the backhaul interface b h I that is stronger than a predetermined threshold, and in response to identifying that the user equipment 111 is receiving a signal from the relay node 116 that is stronger than a predetermined threshold, prioritising (S3) communication between the access node 112 and the identified user equipment 111 via the access interface a i during the periods when the relay node 116 communicates with the donor node 112 over the backhaul interface b h i.

18 Claims, 6 Drawing Sheets

(56) References Cited

U.S. PATENT DOCUMENTS

| | | |
|---|---|---|
| 2010/0008282 A1 | 1/2010 | Bhattad et al. |
| 2010/0080139 A1* | 4/2010 | Palanki et al. ................ 370/252 |
| 2010/0120397 A1* | 5/2010 | Kazmi et al. ................. 455/410 |
| 2010/0128654 A1* | 5/2010 | Zhou et al. ................... 370/315 |
| 2010/0238853 A1* | 9/2010 | Zhou et al. ................... 370/315 |
| 2010/0323614 A1* | 12/2010 | Yu et al. ............................ 455/9 |

\* cited by examiner

REDUCTION OF INTERFERENCE IN RELAY SYSTEMS

TECHNICAL FIELD

The present invention relates to a method and an arrangement in an access node or similar. In particular it relates to a scheme for reducing interferences in relay systems.

BACKGROUND

The demand for higher capacity in wireless communication systems has persisted over the years. As a consequence the various vendors and other actors have produced wireless communication systems with continuously increasing capacity. One example is the wireless communication systems based on the standards produced by the $3^{rd}$ Generation Partnership Project (3GPP, see e.g. www.3gpp.org). Here, the early GSM-systems (Global System for Mobile Communication) have a considerably lower capacity than the more resent Long Term Evolution (LTE) system and LTE-Advanced systems.

LTE-Advanced maintains the basic LTE approach to a large extent. Enhancements include carrier aggregation, higher order MIMO schemes in Downlink and Uplink, enhanced Uplink transmission, Coordinated MultiPoint (CoMP) transmission/reception and the support of relays.

A relay (i.e. a relay node) may be seen as an intelligent repeater. Typically, information is forwarded (possibly in an altered form) by the relay node from a donor node to a user equipment served by the relay node. Conversely, information is typically forwarded (possibly in an altered form) by the relay node from the user equipment to the donor node. Generally, a relay node is typically used to enhance coverage and capacity in a particular area. The particular area may e.g. be a poorly covered area in a cell served by an access node acting as a donor node for the relay node, e.g. an area in radio shadow or an area at the edge of the cell.

LTE-Advance defines at least two different types of relays, Type 1 relay nodes and Type 2 relay nodes. The background discussion in this section may relate to Type 1 relay nodes. However, embodiments of the present solution are equally applicable to other relay nodes, e.g. to Type 2 relay nodes or similar.

Type 1 relay nodes control their cells with their own cell identity, including transmission of synchronization channels and reference symbols. Type 1 relay nodes appear as a Release 8 eNB to Release 8 UEs, which ensures backward-compatible operation. Type 1 relay nodes are e.g. defined in Release 10 of the 3 GPP standards.

FIG. 1 is a schematic illustration of a LTE system comprising a Type 1 relay node (RN) 16 and an eNodeB (eNB) 12 acting as a donor node for the relay node 16. The eNB 12 communicates with a User Equipment (UE) 11 via a first access interface Uu, and the relay node 16 communicates with UE 15 via a second access interface Uu. The relay node 16 and the eNB 12 communicate via a backhaul interface Un. The donor eNB 12 may send downlink user information to and receive uplink user information from the relay node 16 via the backhaul interface Un. The user information is typically forwarded (possibly in an altered form) by the relay node 16 from the eNB 12 to the UE 11, and from the UE 11 to the eNB 12. The eNB 12 may also send control information or similar to the relay node 16 via the backhaul interface Un. The control information may e.g. define the properties of the communication occurring between the relay node 16 and the UE 15.

A relay node is commonly referred to as an inband relay when the communication on the backhaul interface (e.g. Un) on one hand and the access interfaces (e.g. Uu) on the other hand are performed within the same frequency band. Conversely, a relay node is commonly referred to as an outband relay when the communication on the backhaul interface on one hand and the access interfaces on the other hand are performed on separated frequency bands. The discussion in this background section is mainly related to inband relay nodes. However, embodiments of the present solution are equally applicable to outband relay nodes and other relays.

The attention is now turned to FIG. 2. Here, it is assumed that the inband relay node 16 transmits downlink information to the UE 15 via the access interface Uu. It is also assumed that the UE 11 receives downlink information from the eNB 12. It is also assumed that the UE 11 is close to the relay node 16 such that the UE 11 experiences much more interference from the relay node 16 than other UEs being further away from the relay node 16. The interferences have been illustrated by two dashed lines in FIG. 2 extending from the relay node 16 to the UE 11.

In FIG. 3 it is assumed that the UE 11 transmits uplink information to the eNB 12. It is also assumed that the UE 11 is close to the inband relay node 16. The transmitting UE 11 will then create much more interference in the relay node 16 than other UEs further away from the relay node 16. The interferences have been illustrated by two dashed lines in FIG. 3 extending from the UE 11 to the relay node 16.

The expression "close" used in this text should be interpreted such that a UE is receiving a signal from a relay node that is stronger than a predetermined threshold. The effect, when a UE is receiving a signal from a relay node that is stronger than a predetermined threshold, is that a radio signal transmitted from the relay node may cause high interference in the UE in question, or conversely that a radio signal transmitted from the UE may cause high interference in the relay node in question. For example the predetermined threshold may be indicative of the difference (e.g. measured by the UE) between the signal strength of the relay node and the signal strength of the access node serving the UE. The predetermined threshold may e.g. be a difference of less than 3 dB, or less than 6 dB or less than 9 dB. A high interference may e.g. occur if the UE is located within one or a few hundred meters from the relay node, particularly if the UE is in line of sight of the relay node. However, this may not be the case if the UE is located in a "radio shadow" even if the UE is less than a hundred meters from the relay node. Radio shadow may e.g. occur inside an elevator cage made of metal or behind a thick wall made of solid stone or heavily reinforced concrete or some other material that attenuates or stops propagation of radio waves.

SUMMARY OF THE INVENTION

In view of the above there seems to be a need for reducing the interference between a relay node or similar and a UE or similar served by an access node such as an eNB or similar.

At least one of the improvements and/or advantages mentioned above has been accomplished according to a first embodiment of the present invention directed a method in an access node for reducing interference. The access node communicates with a user equipment over a wireless access interface in a wireless communication network. The method comprises the action of obtaining timing information indicative of one or more periods when a relay node communicates with a donor node over a wireless backhaul interface. The method also comprises the actions of identifying that the user equipment is receiving a signal from the relay node communicating with the donor node over the backhaul interface that is stronger than a predetermined threshold, and in response to identifying that the user equipment is receiving a signal from the relay node that is stronger than a predetermined threshold, prioritising communication between the access node and the identified user equipment via the access interface during the periods when the relay node communicates with the donor node over the backhaul interface.

At least one of the improvements and/or advantages mentioned above has been accomplished according to a second embodiment of the present invention directed to an access node for a wireless communication network configured to operatively communicate with a user equipment over a wireless access interface so as to operatively reduce interference. The access node comprises an obtaining unit configured to obtain timing information indicative of one or more periods when a relay node communicates with a donor node over a wireless backhaul interface. In addition, the access node comprises an identifying unit configured to identify that a user equipment is receiving a signal from the relay node communicating with the donor node over the backhaul interface that is stronger than a predetermined threshold. Moreover, the access node also comprises a prioritizing unit configured to, in response to identifying that the user equipment is receiving a signal from the relay node that is stronger than a predetermined threshold, prioritise communication between the access node and the identified user equipment via the access interface during the periods when the relay node communicates with the donor node via the backhaul interface.

Further advantages of the present invention and embodiments thereof will appear from the following detailed description of the invention.

It should be emphasized that the term "comprises/comprising" when used in this specification is taken to specify the presence of stated features, integers, steps or components, but does not preclude the presence or addition of one or more other features, integers, steps, components or groups thereof.

It should also be emphasised that the steps of the exemplifying methods described in this specification must not necessarily be executed in the order in which they appear. Moreover, embodiments of the exemplifying methods described in this specification may comprise fewer steps or additional steps without departing from the scope of the present invention.

DETAILED DESCRIPTION

Structure of Embodiments

Figure 1:
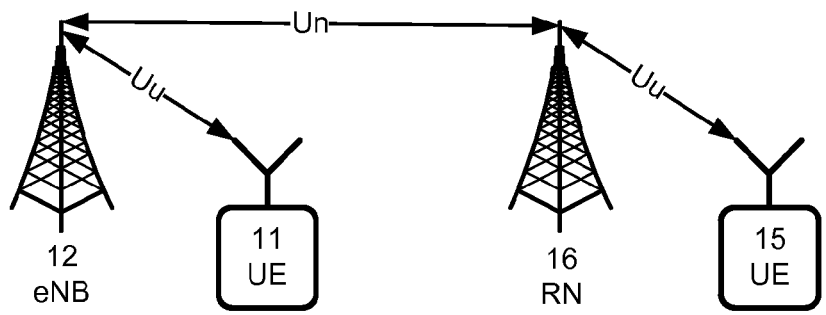
FIG. 1 is a schematic illustration of a LTE system comprising a relay node 16 and an eNodeB 12 acting as a donor node for the relay node 16.
Figure 2:
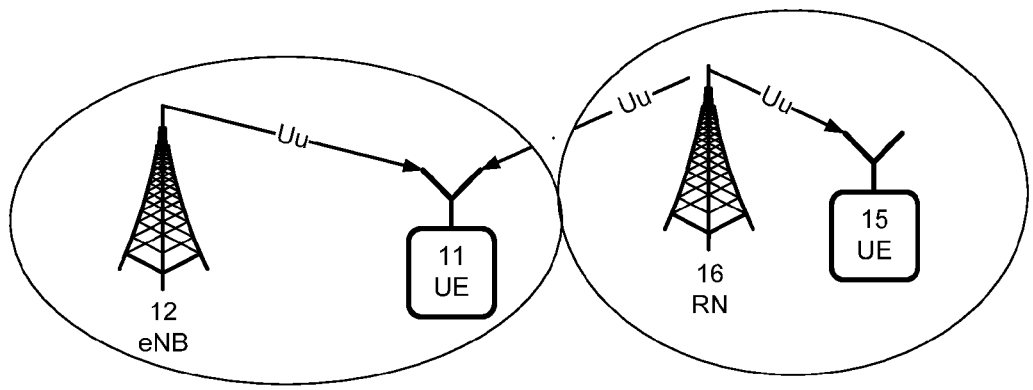
FIG. 2 illustrates the relay node 16 and the eNodeB 12 of FIG. 1, and an additional eNodeB 18 in a downlink scenario.
Figure 3:
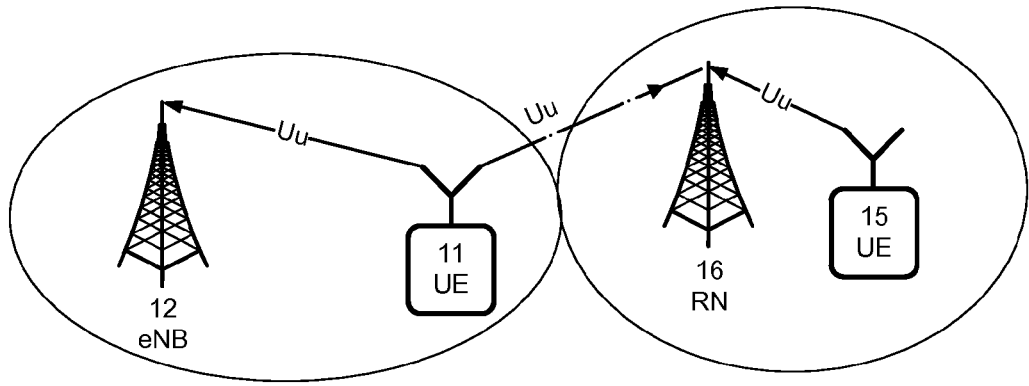
FIG. 3 illustrates the two eNodeBs 12, 18 and the relay node 15 of FIG. 2 in an uplink scenario.
Figure 4:
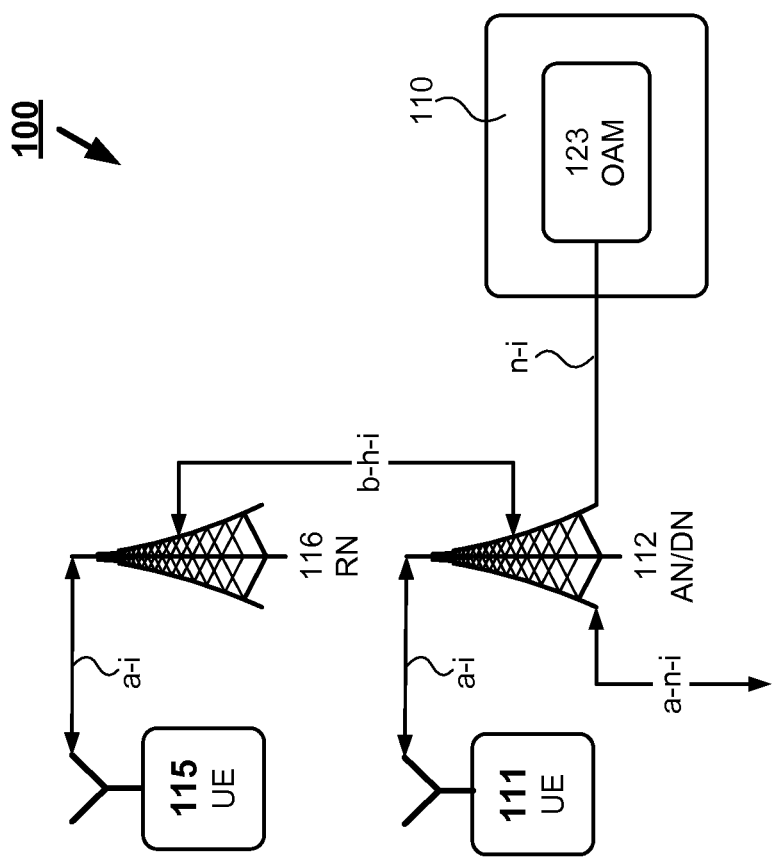
FIG. 4 is a schematic illustration of a general wireless communication system 100, i.a. comprising a relay node 116 and an access node 112 acting as a donor node for the relay node 116.

Embodiments of the present invention may be implemented in a general exemplifying wireless communication system 100 shown in FIG. 4.

An Exemplifying Communication System

FIG. 4 is a schematic illustration of an exemplifying wireless communication system 100 incorporating an embodiment of the present invention. Preferably, the system 100 is a cellular system or similar, though other systems are clearly conceivable. The system 100 comprises a communication network 110, a relay node (RN) 116, an access node (AN) 112 acting as a donor node (DN) for the relay node 116, at least one user equipment (UE) 111 being served by the access node 112 and at least one second UE 115 being served by the relay node 116.

The wireless system 100 is a general representation of particular wireless communication systems, e.g. such as a WiFi system (e.g. according to the IEEE 802.11 standards or similar), or a Worldwide Interoperability for Microwave Access (WiMax) system, e.g. based on the IEEE 802.16 standards or similar), or even a Digital Enhanced Cordless Telecommunication (DECT) system standardized by the European Telecommunication Standards Institute (ETSI), or similar wireless access technology and/or evolutions thereof. Other examples may be a Global System for Mobile Communication (GSM), or a General Packet Radio Service (GPRS) system, or an Enhanced Data rates for GSM Evolution (EDGE) system or an Universal Mobile Telecommunication System (UMTS) or similar based on 3GPP standards and/or evolutions thereof.

In particular, the wireless system 100 may be an LTE system. Thus the network 110 may e.g. correspond to an Evolved Packet Core (EPC) or similar and the access node 112 may e.g. correspond to an eNB or similar configured to act as a donor node for the relay node 116. In turn, the relay node 116 may e.g. correspond to a Type 1 relay node or similar as defined in Release 10 of the 3GPP standards. It follows that the UE 111 and the second UE 115 may correspond to an UE according to the 3GPP specifications related to the LTE.

Wireless communication systems as the system 100 are well known as such to those skilled in the art and they need no detailed explanation. However, a brief overview is given below of the features in the exemplifying system 100 being relevant to embodiments of the present solution.

The access node 112 of system 100 may e.g. be a radio base station or similar, e.g. an eNB or similar. The access node 112 is typically configured to operatively communicate with the UE 111 over a wireless access interface a-i (e.g. an Uu interface according to the 3GPP specifications related to the LTE) so as to connect the UE 111 to the network 110, e.g. to the resources provided by and/or via the network 110. This enables the UE 111 to send and receive information to and from the network 110, e.g. information related to such services as calls, texts, emails, pictures and/or other media content or services or similar, e.g. being available on the Internet or similar.

The access node 112 may be connected to the network 110 via a network interface n-i. The network interface n-i may be based on wired or wireless technology. Particular embodiments of the present solution may use a network interface the form of a S1-U interface according to the 3GPP specifications related to the LTE.

In addition, as can be seen in FIG. 4, the access node 112 may be connected via an access node interface a-n-i to other access node(s) of the same or similar kind. The access node interface a-n-i may be based on wired or wireless technology or similar. For example, the access node interface may be an X2 interface according to the 3GPP specifications related to the LTE. The X2 interface allows interconnection of eNBs with each other and it may support the exchange of signalling between two eNBs, e.g. so as to support the continuation between two eNBs of services provided by an EPC (e.g. during handover between two eNBs).

The access node 112 may also be configured to operatively act as a donor node for the relay node 116. To this end the access node 112 may send downlink user information to and/or receive uplink user information from the relay node 116 via the backhaul interface b-h-i. The user information may e.g. be related to such services as calls, texts, emails, pictures and/or other media content or services or similar. Downlink user information is typically forwarded by the relay node 116 from the access node 112 to the second UE 115 served by the relay node 116. Uplink user information is typically forwarded from the second UE 115 to the access node 112. The access node 112 may also send control information or similar to the relay node 116 via the backhaul interface b-h-i. The control information may relate to timings, frequencies and/or structures or similar to be applied by the relay node 116 with respect to user information and/or control information communicated with the second UE 115 via the access interface a-i.

From here on the access node 112 will be denoted "donor node" unless otherwise stated.

Before proceeding it should be clarified that the UE 111 may be any device that is capable of communicating with the network 110 via the access node 112 or the relay node 116. For example, the UE 111 may be a hand-held telephone, a laptop computer provided with wireless capabilities or any other device that is configured to connect to the access node 112 (or the relay node 116) and the network 110 via the access interface a-i and a network interface n-i respectively. It is preferred that the UE 111 is capable of moving substantially freely around the access node 112 and the relay node 116. It is also preferred that the UE 111 can communicate with a Public Data Network (not shown) or similar via the access node 112 or the relay node 116 and the network 110. Indeed, the second UE 115 may be of the same or similar kind as the UE 111 now described.

The attention is now directed to the relay node 116. The relay node 116 may be seen as an intelligent repeater or similar. The relay node 116 may e.g. be a Type 1 relay node or similar as defined in Release 10 of the 3GPP standards.

The relay node 116 is configured to operatively connect the second UE 115 to the network 110 via the backhaul interface b-h-i and the donor node 112 and the network interface n-i. It is preferred that the second UE 115 is connected to the network 110 via the donor node 112 in the same or substantially same manner as previously described with respect to UE 111. The relay node 116 may simply forward user information and/or control information (e.g. user data and control data) substantially unaffected from the donor node 112 to the second UE 115 served by the relay node 116. Conversely, the relay node 116 may simply forward information received from the served second UE 115 substantially unaffected to the donor node 112. However, the relay node 116 may be more intelligent and it may be configured by the donor node 112 to operatively take its own decisions, e.g. decisions related to the quality, timing, frequency and/or structure or similar to be used for the information communicated with the second UE 115.

Before proceeding it should be added that the communication on the backhaul interface b-h-i and the communication on the access interfaces a-i of the system 100 may be performed within the same frequency band. The relay node 116 is then referred to as an inband relay. It is also possible that the backhaul interface b-h-i and the access interface a-i communicates on separate frequency bands, in which case the relay node 116 is referred as an outband relay.

As can be seen in FIG. 4, the network 110 may comprise an Operation and Maintenance (OAM) node 123 and/or function or similar. The OAM 123 may be a functional entity from which the network operator monitors and controls the system 100. The OAM 123 may e.g. offer the network operator support for centralized, regional, and local operational and maintenance activities. The OAM 123 may e.g. administrate the commercial operation related to such features as subscription, end terminals, charging and statistics, security management, network configuration, operation and performance management and/or maintenance tasks etc.

Function of Embodiments

As indicated above in the Background section, to enable an inband relay node to be functional, it is preferred that the relay node does not transmit and receive at the same time on the same frequency, since this could cause sever (self)interference. Thus, the discussion in the present section may relate mainly to inband relay nodes. However, it should be emphasised that embodiments of the present solution may be equally applicable to outband relay nodes and other relays.

With respect to LTE systems or similar it is preferred to prevent a relay node 116 from downlink transmissions by letting the donor node 112 and/or the relay node 116 itself configure certain subframes as Multimedia Broadcast multicast service Single Frequency Network (MBSFN) subframes. During a MBSFN subframe, the second UE 115 served by the relay node 116 does not expect to receive any transmissions from the relay node 116, beyond what is transmitted in the first two Orthogonal Frequency Division Multiplexing (OFDM) symbols of the subframe. Instead of transmitting to the served second UE 115, the relay node listens to downlink transmissions from the donor eNB on the Un backhaul interface during the rest of these subframes, which are used for carrying downlink data from the donor node 112 to the relay node 116.

Figure 5:
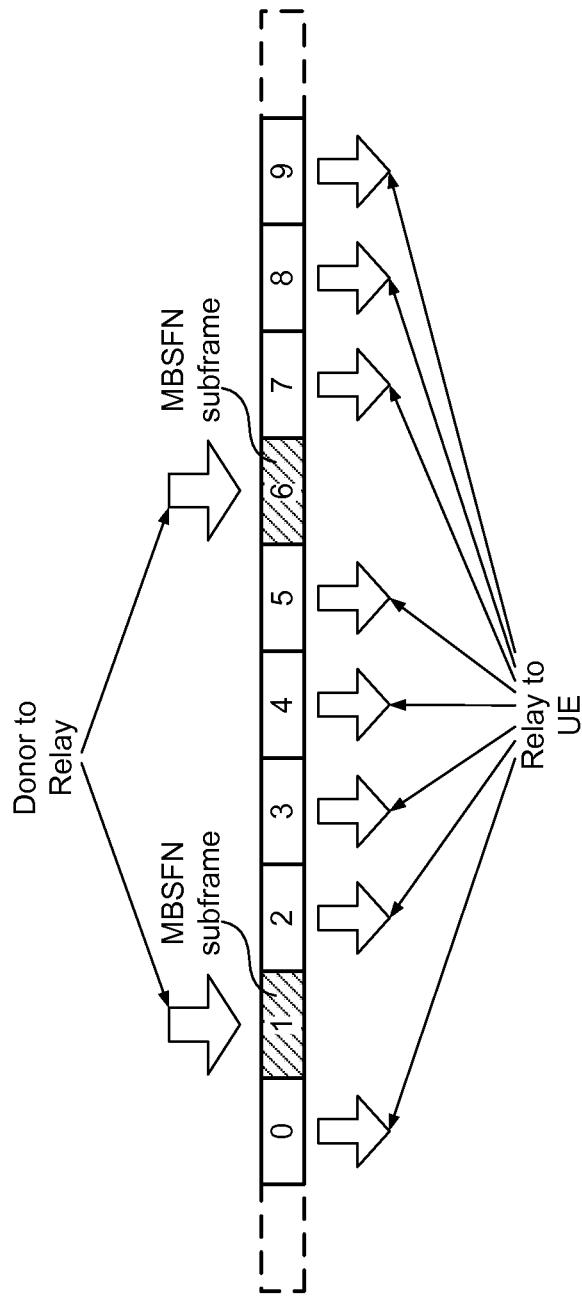
FIG. 5 is a schematic illustration of ten (10) subframes in a basic LTE type 1 frame.

An allocation of subframes is illustrated in FIG. 5 showing ten (10) subframes in a basic LTE type 1 frame. It should be clarified that the present solution may be applied to other frames and subframes, e.g. LTE type 2 frames or similar. The overall length of a basic LTE type 1 frame is 10 ms and the frame is divided into a total of 20 individual slots, such that each LTE subframe consist of two slots. Merely as an illustrative example, subframes 1 and 6 in FIG. 6 have been configured as MBSFN subframes used by the donor eNB for downlink transmission to the relay node served by the donor eNB. At most six subframes in a type 1 frame can be configured for MBSFN (subframes [0 4 5 9] can typically not be configured for MBSFN). This implies that at most six of the ten subframes in a type 1 frame can be used for Un downlink transmissions.

Now, according to an embodiment of the present solution, described with reference to FIG. 4, if the UE 111 served by the donor node 112 is "close" to the relay node 116 it will be scheduled (i.e. prioritised) when the relay node 116 uses the backhaul interface b-h-i.

It is preferred that downlink communication to the UE 111 is prioritised when the inband relay node 116 receives communication from the donor node 112. The relay node 116 is then listening and it will therefore not transmit any signals that may cause interference in the UE 111 being "close" to the relay node 116. The UE 111 will then be prioritised when the relay node 116 receives transmissions from the donor node 112 using MBSFN subframes as indicated above.

Conversely, it is preferred that uplink communication from said UE 111 is prioritised when the inband relay node 116 transmits communication to the donor node 112. The relay node 116 is then transmitting (i.e. not listening) and it will not be sensitive to any interference from signals transmitted by the UE 111 being "close" to the relay node 116.

To be able to realize the embodiments described above the donor node 112 serving the UE 111 being "close" to a relay node 116 may preferably need the following information:

1) Information about which neighbouring cells that are served by a relay node 116.
2) For each relay node 116, information about the configuration of the backhaul interface b-h-i (preferably the Uu/Un subframe allocation). Both downlink and uplink backhaul link allocation is preferably acquired (it might also be the case that the downlink backhaul link configuration implicitly provides the uplink backhaul allocation).
3) Information about how "close" (radio propagation wise—not necessary distance in meters) a UE 111 served by the donor node 112 is to a relay node 116.

It should be emphasised that this information may preferably be needed by all access nodes, e.g. including ordinary access nodes, donor nodes and even relay nodes serving an UE being "close" to a relay node.

With reference to the communication system in FIG. 4, the information needed for bullet 1 and 2 above may be known by the donor node 112 it self, e.g. being predefined in the donor node 112 and/or set by algorithms or similar running in the donor node 112. Alternatively, the donor node 112 may obtain the information needed from other access nodes and/or donor nodes via the access node interface a-n-i, or alternatively be provided from the OAM system 123 or similar via the network interface n-i. Note that this kind of information may be needed in both the donor node 112 serving the UE 111 that is "close" to the relay node 116, and in the relay node 116 serving the second UE 115 that may be "close" to another relay node.

Regarding bullet 3 above, there is a need for the donor node 112 to decide whether the UE 111 can be grouped as "close", i.e. receiving a signal from a particular neighbouring relay node that is stronger than a predetermined threshold, e.g. the relay node 116. The same applies to relay node 116 serving the second UE 115 that may be "close" to another neighbouring relay node.

In the framework of the current 3GPP LTE standard, this may e.g. be done by means of distance measurement reporting configurations, e.g. an event based measurement reporting scheme. Here, the UE in question may perform measurements continuously but does not send any report to the serving access node until certain constraints (preferably predefined) have been fulfilled.

An event based distance measurement reporting scheme is advantageous compared to a periodic or continuous reporting scheme or similar, since it reduces the overall communication between the UE and the eNB, or the UE and the relay node as may be the case. An example of an event is that the difference between the Reference Signal Received Power (RSRP) of a neighbouring cell (e.g. a relay cell) and the RSRP of a serving cell (a eNB cell or a relay node cell) is less than 3 dB, or less than 6 dB or less than 9 dB. Still, this type of measurement is fully network controlled, since the evaluation criteria (might be multiple), i.e. the event specifications, are configured by the network. According to the existing 3GPP LTE standard, it is possible for the network to configure cell specific offsets to different cells. This is done by informing the UE of the cell index, the Physical Cell Identity (PCID) of the cell in question and an offset to the measurement. Upon evaluating whether a measurement report should be generated or not this offset is considered.

Hence, with respect to the current 3GPP LTE standard, the above implies that if e.g. a donor node 112 or an ordinary access node as may be the case wants to know whether a served UE 111 "close" to a certain neighbouring relay node 116, it can configure the UE 111 to send measurement reports when the relay node signal strength received by the UE is X dB below the RSRP of the serving donor node 112 or ordinary access node as may be the case. The same applies mutatis mutandis to a relay node 116 which, according to embodiments of the present solution, may configure the served second UE 115 to send distance measurement reports when the strength of a signal from another relay node measured by the second UE 115 is X dB below the RSRP of the serving relay node 116.

Figure 6:
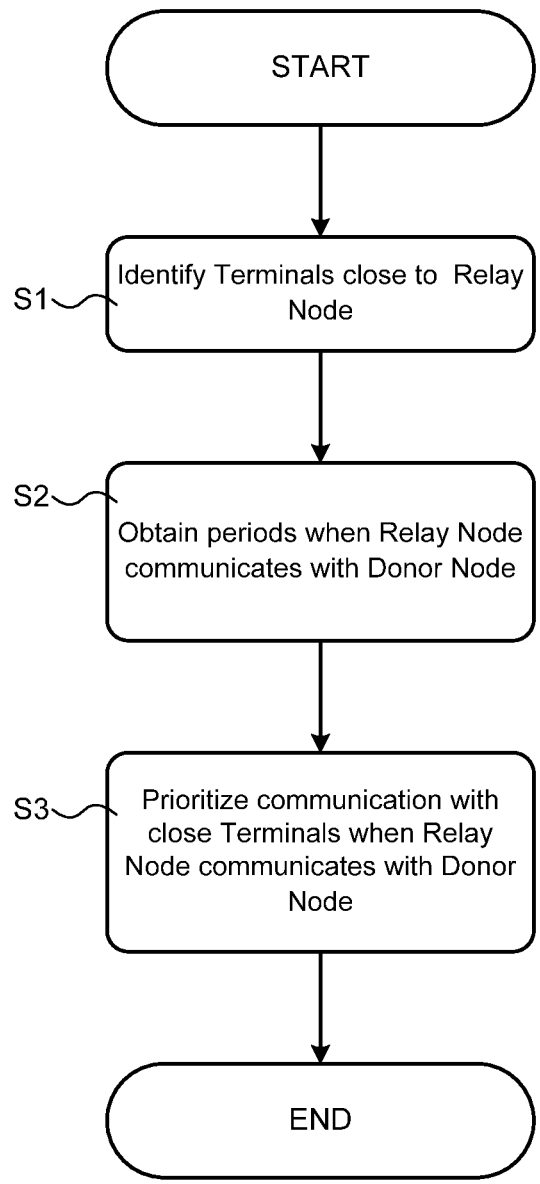
FIG. 6 is a schematic flowchart illustrating an exemplifying method according to an embodiment of the present invention.
Figure 7:
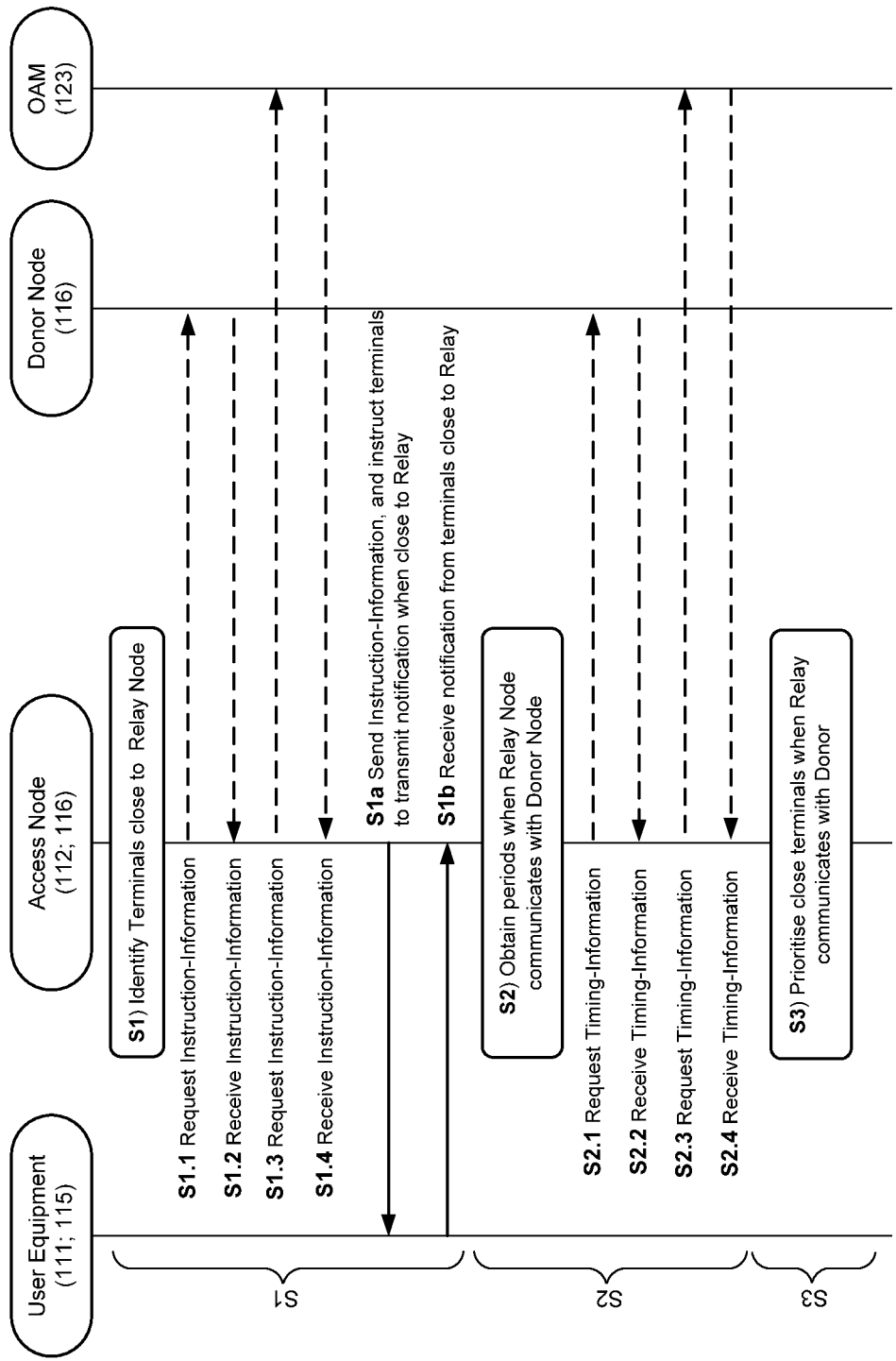
FIG. 7 is a schematic sequence diagram illustrating exemplifying methods according to embodiments of the present invention.

The attention is now directed to the flowchart shown in FIG. 6 and the sequence diagram shown in FIG. 7 illustrating the operation of exemplifying embodiments of the present solution.

The operation of the present solution reduces interference in a relay system and it is performed in the access node 112. Indeed, the particular access node 112 acts as a donor node for the relay node 116. Below, the access node 112 will therefore alternately be denoted access node and/or donor node. The different roles will be apparent from the explaining text.

As mentioned above, the access node 112 communicates with the UE 111 over the wireless access interface a-i in the wireless communication network 100. It should be emphasised that even a relay node such as the relay node 116 is in fact an access serving the second UE 115 over a wireless access interface a-i.

Action S1

In this action S1 the access node 112 identifies that the UE 111 is receiving a signal from the relay node 116 communicating with the donor node 112 over the backhaul interface b-h-i that is stronger than a predetermined threshold.

Note that the access node 112 is also the donor node for the relay node 116, thus forming a single node. However, other access nodes according to embodiment of the present solution may not be donor nodes but may nevertheless serve an UE that is receiving a signal from the relay node 116 that is stronger than a predetermined threshold. The access node in question and the donor node 112 are then two separate nodes. Such access nodes may, in the same or similar manner as the access node 112, identify a served UE that is receiving a signal from the relay node 116 communicating with the donor node 112 that is stronger than a predetermined threshold.

To enable the identification in action S1 the position of the UE 111 may e.g. be obtained by means of the UE 111, e.g. by utilizing a Global Positioning System (GPS) function or similar implemented in the UE 111. The access node 112 may then instruct the UE 111 to report its position to the access node 112 at predetermined intervals, or instruct the UE 111 to only report to the access node 112 when the UE 111 is receiving a signal from the relay node 116 that is stronger than a predetermined threshold. The position of the relay node 116 may e.g. be provided to the UE 111 by the access node 112, which enables the GPS equipped UE 111 to calculate the distance to the relay node 116, e.g. by using the current position of the UE 111 and the position of the relay node 116. Alternatively, the position of the UE 111 may be obtained by the access node 112 utilising triangulation and/or roundtrip timing calculations or similar, possibly in corporation with the communication network 110.

The position of the relevant relay nodes (e.g. relay node 116) may be predefined in the access node 112 at the time of installation of the site. Alternatively, the access node 112 may request the position of the relay node(s) from the communication network 110. If a relay node in question is served by another donor node, then the access node 112 may request the position of the relay node from the donor node in question via the access node interface a-n-i. The position of the access node 112 itself may be predefined in the access node 111 at the time of installation of the site, or be requested by the access node 112 from the communication network 110.

Generally, at least relay nodes that have a cell that is adjacent to or within the cell of the access node in question may be considered as relevant.

In an alternative to the solutions suggested above the UE 111 may, according to the sequence diagram in FIG. 7, be identified as receiving a signal from the relay node 116 that is stronger than a predetermined threshold by an action S1a where the access node 112 identifies that the UE 111 is receiving a signal from the relay node 116 that is stronger than a predetermined threshold by sending an instruction to the UE 111 requesting the UE 111 to notify the access node 112 when the signal strength of the relay node 116 measured by the UE 111 exceeds the predetermined threshold. In another action S1b the access node 112 receives a notification from the UE 111 when the signal strength from the relay node 116 exceeds the predetermined threshold. The predetermined threshold may e.g. indicate the difference between the signal power (e.g. RSRP) received by the UE 111 from the relay node 116 and the signal power (e.g. RSRP) received by the UE 111 from the serving access node 112. The predetermined threshold may e.g. be reached if this difference is less than 3 dB, or less than 6 dB or less than 9 dB. The predetermined threshold may e.g. be set in dB as indicated above or any other measure indicating the strength of a wireless signal.

As indicated in FIG. 7, the information in the instruction sent to the UE 111 may be obtained by an action S1.1 where the access node 112 sends a request for instruction information to the donor node 112 for the relay node 116. Since the access node 112 is the donor node for the relay node 116 it may send the request to itself, e.g. by requesting the information from a memory within the node. However, other access nodes according to embodiment of the present solution may not be donor nodes but they may nevertheless serve an UE that is receiving a signal from the relay node 116 that is stronger than a predetermined threshold. The access node in question may then send the request to the donor node 112 via the access node interface a-n-i. In another action S1.2 the access node 112 receives the requested instruction information from the donor node. The access node 112 being a donor node for the relay node 116 may receive the requested information from itself, e.g. from a memory within the node. However, other access nodes according to embodiment of the present solution may not being donor nodes may receive the requested information from the donor node 112 via the access node interface a-n-i.

Alternatively, the information in the instruction sent to the UE 111 may be obtained by an action S1.3 where the access node 112 sends a request for instruction information to the OAM function 123 of the communication network 110 via the network interface n-i. In another action S1.4 the access node 112 may receive such instruction information from the OAM function 123 via the network interface n-i.

The instruction sent to the UE 111 may comprise information indicative of at least one of; the identity of the relay node and/or the predetermined threshold.

Generally, it may be preferred that the information comprises the identity of the possible relay node(s) that is close to the access node in question, since an UE served by the access node is most likely to be close to such relay nodes. The identity of the relay node enables the UE to measure signals from the relevant relay node(s) and to ignore signals from other relay nodes. Naturally, this assumes that the transmitting relay nodes can be identified. This may e.g. be done by obtaining the identity from the very signals transmitted by the relay node(s), or by simply requesting the identity directly from the relay node(s). Knowing the identity of the relevant relay node(s) may e.g. be beneficial if there are two relay nodes close to the access node but only one is an inband relay node transmitting and/or receiving on the same frequency as a UE close to the relay nodes but served by the access node. Here, only the inband relay node may be identified in the instruction information sent to the UE and the UE can then select to only measure signals from the identified relay node. Signals from the outband relay node may not be measured, since they will typically not cause interferences with respect to the UE and/or the inband relay in question.

Action S2

In this action S2 the access node 112 obtains timing information indicative of one or more periods when the relay node 116 communicates with the donor node 112 over the wireless backhaul interface b-h-i.

Note that the access node 112 is also the donor node for the relay node 116, thus forming a single node. However, other access nodes according to embodiments of the present solution may not be donor nodes but they may nevertheless serve an UE that is close to the relay node 116. The access node in question and the donor node 112 are then two separate nodes. Such access nodes may obtain timing information from the donor node 112 or from the network 110 as will be explained in more detail below.

As indicated in FIG. 7, the timing information may be obtained by an action S2.1 where the access node 112 sends a request for such timing information to the donor node 112 for the relay node 116. Since the access node 112 is actually the donor node for the relay node 116 it may send the request to itself, e.g. by requesting the information from a memory within the node. However, other access nodes according to embodiment of the present solution may not be donor nodes, but they may nevertheless serve an UE that is close to the relay node 116. The access node in question may then send the request to the donor node 112 via the access node interface a-n-i. In another action S2.3 the access node 112 receives such instruction information from the donor node. Since the access node 112 is the donor node for the relay node 116 it may receive the requested information from itself, e.g. from a memory within the access node 112. However, other access nodes according to embodiment of the present solution not being donor nodes may receive the requested information from the donor node 112 via the access node interface a-n-i.

Alternatively, the timing information may e.g. be obtained by an action S2.3 where the access node 112 sends a request for timing information to the OAM function 123 via the network interface n-i. In another action S2.3' the access node 112 may receive such instruction information from the OAM function 123.

As indicated above, the timing information may be obtained from the donor node 112 via the access node interface a-n-i, or from the Operation and Maintenance function of the of the communication network via the network interface n-i.

The timing information may be indicative of the periods when the relay node 116 receives downlink communication from, or transmits uplink communication to the donor node 112.

More particularly, the timing information may be indicative of a set of subframes in which the relay node 116 receives downlink communication from the donor node 112. The subframes may e.g. be MBSFN subframes.

Action S3

In this action S3 the access node 112 will, in response to identifying that the UE 111 is receiving a signal from the relay node 116 that is stronger than a predetermined threshold, prioritise communication between the access node 112 and the identified UE 111 via the access interface a-i during the periods when the relay node 116 communicates with the donor node over the backhaul interface b-h-i.

Note that the access node 112 is a donor node for the relay node 116, thus forming a single node. However, other access nodes according to embodiment of the present solution may not be donor nodes but they may nevertheless serve an UE that is close to the relay node 116. The access node in question may then prioritise communication with the served UE via an access interface a-i when the relay node 116 communicates with the donor node 112 over the backhaul interface b-h-i.

In one embodiment, the access node 112 may prioritise communication between the access node 112 and the identified UE 111 by prioritising downlink communication from the access node 112 to identified UE 111 during the time periods when the relay node 116 receives downlink communication from the donor node 112. The relay node 116 is then listening and it will therefore not transmit any signals that may cause interference in the UE 111 being close to the relay node 116 but served directly by the access node 112.

In another embodiment, the access node 112 may prioritise communication between the access node 112 and the identified UE 111 by prioritising uplink communication from the identified UE 111 to the access node 112 during the time periods when the relay node 116 transmits uplink communication to the donor node 112. The relay node 116 is then transmitting (i.e. not receiving) and it will not be sensitive to any interference from signals transmitted by the UE 111 being close to the relay node 116 but served by the access node 112.

Figure 8:
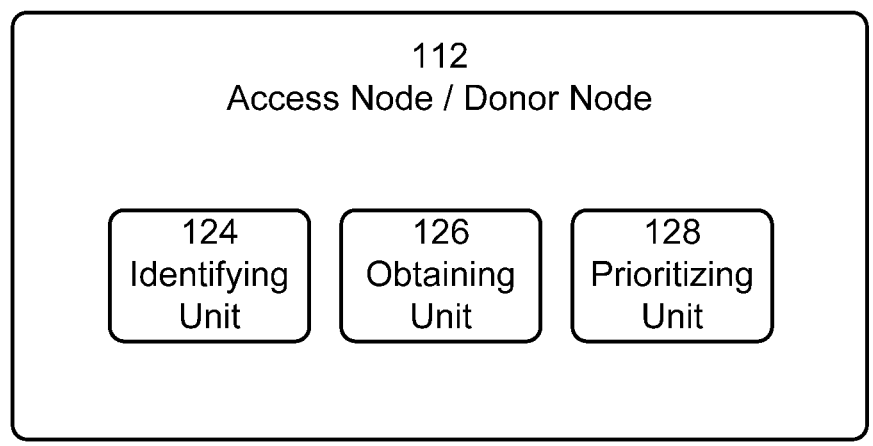
FIG. 8 is a schematic illustration of the donor node 112 configured according to an embodiment of the present solution.

To perform the actions discussed above reducing interference in a relay system, the access node 112 may comprise an arrangement as depicted in FIG. 8. It is preferred that the decision unit 122 comprises an identifying unit 124, an obtaining unit 126 and a prioritizing unit 128. The decision unit 122 may be implemented by means of hardware and/or software and it may comprise one or several hardware units and/or software modules, e.g. one or several processor units provided with or having access to the software and/or hardware required to operatively perform the actions and/or functions defined in the appended claims.

More particularly, the access node 112 is configured to operate in the wireless communication network 100 and it is further configured to operatively communicate with the UE 111 over the wireless access interface a-i and to operatively reduce interference in the communication network 100.

The access node 112 comprises the obtaining unit 126 configured to obtain timing information indicative of one or more periods when the relay node 116 communicates with the donor node 112 over the backhaul interface b-h-i. In addition, the access node 112 comprises the identifying unit 124 configured to identify that the UE 111 is receiving a signal from the relay node 116 communicating with the donor node 112 over the wireless backhaul interface b-h-i that is stronger than a predetermined threshold. The access node 112 also comprises the prioritizing unit 128 configured to, in response to identifying that the UE 111 is receiving a signal from the relay node 116 that is stronger than a predetermined threshold, prioritise communication between the access node 112 and the identified UE 111 via the access interface a-i during the periods when the relay node 116 communicates with the donor node 112 via the backhaul interface b-h-i.

Before proceeding it should be noted that the access node 112 is also the donor node for the relay node 116, thus forming a single node. However, other access nodes according to embodiments of the present solution may not be donor nodes but may nevertheless serve an UE that is close to the relay node 116. The access node in question and the donor node 112 are then two separate nodes. The discussion above related to two (2) such separate nodes applies mutatis mutandis to the present discussion of the access node required to perform the actions previously discussed. Thus, the access node 112 and the units 124, 126 and 128 respectively may be arranged to operatively perform the actions previously discussed with reference to the flowchart shown in FIG. 6 and the sequence diagram shown in FIG. 7. In particular, the access node 112 and the units 124, 126, 128 respectively may be arranged to operatively perform the actions S1, S1a, S1b, S1.1, S1.2, S1.3, S1.4 and S2, S2.1, S2.2, S2.3, S2.4 and S3 respectively.

Thus, the identifying unit 124 may be configured to identify that the UE 111 is receiving a signal from the relay node 116 that is stronger than a predetermined threshold by operatively send an instruction to the UE 111 requesting the UE 112 to notify the access node 112 when the signal strength from the relay node 116 measured by the UE 111 exceeds the predetermined threshold. The identification unit 124 may also be configured to operatively receive a notification from the UE 111 when the signal strength from the relay node 116 exceeds the predetermined threshold.

The identification unit 124 may be configured to send the instruction to the UE 111 by sending an instruction to the UE 111 indicating at least one of; the identity of the relay node 116 and/or the predetermined threshold.

The obtaining unit 126 may be configured to obtain timing information indicative of the periods when the relay node 116 receives downlink communication from, or transmits uplink communication to the donor node 112.

The obtaining unit 126 may be configured to obtain timing information indicative of a set of subframes in which the relay node 116 receives downlink communication from the donor node 112.

The obtaining unit 126 may be configured to obtain the timing information from the donor node 112 via the access node interface a-n-i, or from the OAM function 123 of the communication network 100 via the network interface n-i.

The prioritizing unit 128 may be configured to prioritise communication between the access node 112 and the identified UE 111 by prioritising downlink communication from the access node 112 to the identified UE 111 during the time periods when the relay node 116 receives downlink communication from the donor node 112.

The prioritizing unit 128 may be configured to prioritise communication between the access node 112 and the identified UE 111 by prioritising uplink communication from the identified UE 111 to the access node 112 during the time periods when the relay node 116 transmits uplink communication to the donor node 112.

As previously indicated above, the access node 112 may act as the donor node 112 for the relay node 116.

According to an embodiment of the present solution, there may be a first relay node and the access node may be a second relay node (116). In other words, according to an embodiment of the present solution there may be a first relay node at the same time as the relay node 116 may be a second relay node serving as an access node for the second UE 115 that is close to the first relay node.

The present invention has now been described with reference to exemplifying embodiments. However, the invention is not limited to the embodiments described herein. On the contrary, the full extent of the invention is only determined by the scope of the appended claims.

The invention claimed is:

1. A method in an access node for reducing interference, the access node communicating with a user equipment over a wireless access interface in a wireless communication network, the method comprising:
   obtaining timing information indicative of one or more periods when a relay node communicates with a donor node over a wireless backhaul interface,
   identifying that the user equipment is receiving a signal from the relay node communicating with the donor node over the backhaul interface that is stronger than a predetermined threshold, and
   in response to identifying that the user equipment is receiving a signal from the relay node that is stronger than a predetermined threshold, prioritising communication between the access node and the identified user equipment via the access interface during the periods when the relay node communicates with the donor node over the backhaul interface.

2. The method according to claim 1, wherein identifying that the user equipment is receiving a signal from the relay node that is stronger than a predetermined threshold comprises:
   sending an instruction to the user equipment requesting the user equipment to notify the access node when the signal strength of the relay node measured by the user equipment exceeds the predetermined threshold, and
   receiving a notification from the user equipment when the signal strength from the relay node exceeds the predetermined threshold.

3. The method according to claim 2, wherein the instruction sent to the user equipment comprises information indicative of at least one of; the identity of the relay node and/or the predetermined threshold.

4. The method according to claim 1, wherein the timing information is indicative of the periods when the relay node receives downlink communication from, or transmits uplink communication to the donor node.

5. The method according to claim 1, wherein the timing information is indicative of a set of subframes in which the relay node receives downlink communication from the donor node.

6. The method according to claim 1, wherein the timing information is obtained from the donor node via an access node interface, or obtained from an Operation and Maintenance function of the of the communication network via a network interface.

7. The method according to claim 1, wherein prioritising communication between the access node and the identified user equipment comprises prioritising downlink communication from the access node to the identified user equipment during time periods when the relay node receives downlink communication from the donor node.

8. The method according to claim 1, wherein prioritising communication between the access node and the identified user equipment comprises prioritising uplink communication from the identified user equipment to the access node during time periods when the relay node transmits uplink communication to the donor node.

9. An access node for a wireless communication network configured to operatively communicate with a user equipment over a wireless access interface and to operatively reduce interference, which access node comprises:
   an obtaining unit configured to obtain timing information indicative of one or more periods when a relay node communicates with a donor node over a wireless backhaul interface,
   an identifying unit configured to identify that a user equipment is receiving a signal from the relay node communicating with the donor node over the backhaul interface that is stronger than a predetermined threshold, and
   a prioritizing unit configured to, in response to identifying that the user equipment is receiving a signal from the relay node that is stronger than a predetermined threshold, prioritise communication between the access node and the identified user equipment via the access interface during the periods when the relay node communicates with the donor node via the backhaul interface.

10. The access node according to claim 9, configured to identify that the user equipment is receiving a signal from the relay node that is stronger than a predetermined threshold by operatively:
   send an instruction to the user equipment requesting the user equipment to notify the access node when a signal strength of the relay node measured by the user equipment exceeds the predetermined threshold, and
   receive a notification from the user equipment when the signal strength from the relay node exceeds the predetermined threshold.

11. The access node according to claim 10, configured to send the instruction to the user equipment by sending an instruction to the user equipment, indicating at least one of; the identity of the relay node and/or the predetermined threshold.

12. The access node according to claim 9, configured to obtain timing information indicative of the periods when the relay node receives downlink communication from, or transmits uplink communication to the donor node.

13. The access node according to claim 9, configured to obtain timing information indicative of a set of subframes in which the relay node receives downlink communication from the donor node.

14. The access node according to claim 9, configured to obtain the timing information from the donor node via an access node interface, or from an operation and maintenance function of the communication network via a network interface.

15. The access node according to claim 9, configured to prioritise communication between the access node and the identified user equipment by prioritising downlink communication from the access node to the identified user equipment during the time periods when the relay node receives downlink communication from the donor node.

16. The access node according to claim 9, configured to prioritise communication between the access node and the identified user equipment by prioritising uplink communication from the identified user equipment to the access node during the time periods when the relay node transmits uplink communication to the donor node.

17. The access node according to claim 9, wherein the access node is also the donor node.

18. The access node according to any one of claim 9, wherein the relay node is a first relay node and the access node is a second relay node.

* * * * *

UNITED STATES PATENT AND TRADEMARK OFFICE
CERTIFICATE OF CORRECTION

Page 1 of 2

PATENT NO. : 8,861,427 B2
APPLICATION NO. : 13/805918
DATED : October 14, 2014
INVENTOR(S) : Naslund et al.

It is certified that error appears in the above-identified patent and that said Letters Patent is hereby corrected as shown below:

On the title page item (57), under "ABSTRACT", in Column 2, Line 2, delete "interference" and insert -- interference. --, therefor.

On the title page item (57), under "ABSTRACT", in Column 2, Line 4, delete "network 100" and insert -- network 100. --, therefor.

In the Drawings,

In Fig. 7, Sheet 5 of 6, delete "Donor Node (116)" and insert -- Relay Node (116) --, therefor.

In Fig. 7, Sheet 5 of 6, delete "Access Node (112; 116)" and insert -- Access Node/Donor Node (112) --, therefor.

In the Specification,

In Column 3, Line 56, delete "node 15" and insert -- node 16 --, therefor.

In Column 3, Line 58, delete "i.a." and insert -- i.e. --, therefor.

In Column 4, Lines 2-3, delete "solution," and insert -- solution. --, therefor.

In Column 9, Line 20, delete "node 111" and insert -- node 112 --, therefor.

In Column 10, Line 67, delete "via the 25" and insert -- via the --, therefor.

In Column 12, Line 37, delete "UE 112" and insert -- UE 111 --, therefor.

Signed and Sealed this
Nineteenth Day of May, 2015

Michelle K. Lee
*Director of the United States Patent and Trademark Office*

CERTIFICATE OF CORRECTION (continued)
U.S. Pat. No. 8,861,427 B2

In the Claims,

In Column 15, Line 6, in Claim 18, delete "to any one of claim" and insert -- to claim --, therefor.